United States Patent [19]  [11] 3,714,241
Grenda  [45] Jan. 30, 1973

[54] PREPARATION OF α-METHYL-3,4-DISUBSTITUTED PHENYLALANINES

[75] Inventor: Victor J. Grenda, Warren, N.J.

[73] Assignee: Merck & Co. Inc., Rahway, N.J.

[22] Filed: Oct. 29, 1969

[21] Appl. No.: 870,827

Related U.S. Application Data

[62] Division of Ser. No. 619,161, Feb. 28, 1967, Pat. No. 3,553,197.

[52] U.S. Cl.............260/519, 260/340.5, 260/471 A
[51] Int. Cl.............................................C07c 101/08
[58] Field of Search................260/340.5, 471 A, 519

[56] References Cited

UNITED STATES PATENTS 3,321,514   5/1967   Eisenmann.......................260/471 A Primary Examiner—Lorraine A. Weinberger
Assistant Examiner—L. Arnold Thaxton
Attorney—Erma R. Coutts, Harry E. Westlake, Jr. and I. Louis Wolk

[57] ABSTRACT

α-Methyl-3,4-disubstituted phenylalanines are prepared by a process which comprises converting a 3,4-disubstituted-α-methylcinnamic acid derivative to a 2-methyl-2,3-dihalo-3-(3',4'-disubstituted phenyl)-propionic acid, reacting the 2,3-dihalo propionic acid with an amine to form a 3-(3',4'-disubstituted phenyl)-2-methyl-2-aziridine derivative and hydrogenolyzing the aziridine derivative to the desired product. The aziridine derivatives themselves are claimed. The α-methyl-3,4-disubstituted phenylalanines are useful compounds in the treatment of hypertension.

8 Claims, No Drawings

PREPARATION OF α-METHYL-3,4-DISUBSTITUTED PHENYLALANINES

This application is a division of U.S. Ser. No. 619,161 filed Feb. 28, 1967, now U.S. Pat. No. 3,553,197.

This invention relates to a process for the preparation of α-methyl-3,4-disubstituted phenylalanines, particularly to a novel process for the production of α-methyl-3,4-dihydroxy phenylalanine.

More particularly, the process of the present invention relates to the conversion of a 3-(3',4'-disubstituted phenyl)-2-methyl-2-aziridino derivative to the desired α-methyl-3,4-disubstituted phenylalanine. Still more particularly, the present invention relates to a process for the preparation of α-methyl-3,4-disubstituted phenyl-alanine by the conversion of a 3,4-disubstituted-α-methyl cinnamic acid derivative to a 2-methyl-2,3-dihalo-3-(3',4'-disubstituted phenyl)propionic acid derivative, reaction of said 2,3-dihalo propionic acid derivative with ammonia or a substituted amine to form a 3-(3',4'-disubstituted phenyl)-2-methyl-2-aziridine derivative and conversion of the 3-(3',4'-disubstituted phenyl)-2-methyl-2-aziridine derivative by a hydrogenolysis reaction to the desired product.

be accomplished by known methods of resolution of racemic mixtures into their optically active components, one such method being a direct resolution as described in U.S. Pat. No. 3,158,648. However, the L-form of the desired α-methyl-β-3,4-disubstituted phenylalanine derivatives particularly the L-α-methyl-3,4-dihydroxy phenylalanine can be prepared directly by the novel process of my invention by using the related L-aziridine compound. The L-form of any of the aziridine intermediates can be obtained by known methods of resolution. Thus if one started with the L-form of the particular aziridine derivative namely for exemplary purpose the L-3-(3',4'-disubstituted phenyl)-2-methyl-2-aziridino derivative, one could prepare the L-α-methyl-3,4-disubstituted phenylalanine or derivatives thereof directly.

It is an object of this invention to provide a novel process for the preparation of α-methyl-3,4-disubstituted phenylalanine. Another object of this invention is to provide a novel and economical process for the preparation of active α-methyl-3,4-disubstituted phenylalanines which utilizes a novel aziridine derivative.

The process of my invention can be shown by the following reaction sequence.

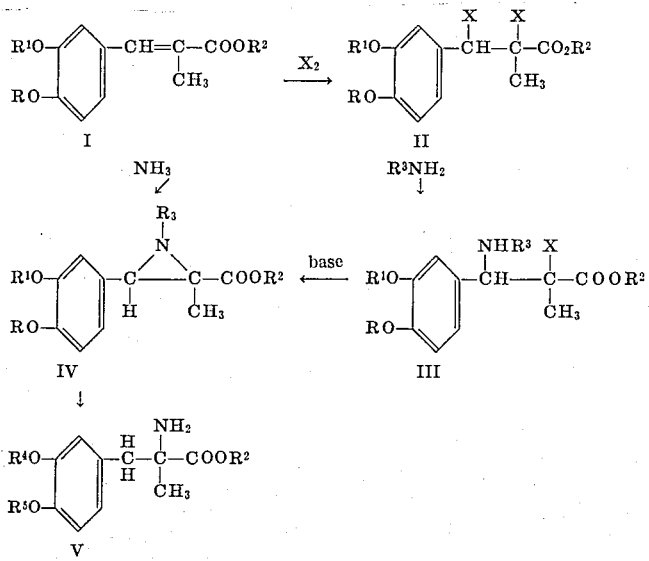

Also the invention relates to novel 3-(3',4'-disubstituted phenyl)-2-methyl-2-aziridine derivatives which can be used as intermediates in the formation of biologically active α-methyl-3,4-disubstituted phenylalanines.

The compounds produced by the process of this invention are important intermediates in the production of certain optically active derivatives of phenylalanine. One of the compounds produced by the process of this invention is α-methyl-β-3,4-dihydroxy phenylalanine, which has been shown to be active in reducing blood pressure of warm blooded animals. The L-isomer of α-methyl-β-3,4-dihydroxy phenylalanine otherwise known as α-methylDOPA has been used in the treatment of hundreds of patients suffering from hypertension and, as such, has been sold on a commercial scale for use in such treatment. The racemic α-methyl-β-3,4-dihydroxyphenylalanine produced by the process of the present invention is an intermediate in the preparation of the L-isomer of this compound. Conversion of the racemic compound to the optically active L-isomer can wherein R and $R^1$ are the same or different and are alkyl, aryl or aralkyl or when taken together represent a methylene group.

$R^2$ is hydrogen, alkyl, aryl or aralkyl.

$R^3$ is hydrogen, alkyl, aryl or aralkyl.

$R^4$ and $R^5$ are hydrogen, aryl, alkyl or aralkyl or when taken together represent a methylene group and X is halogen, preferably chloro or bromo.

It has been found that although the starting materials (formula I) can be those wherein R and $R^1$ are alkyl, aryl or aralkyl, it is preferable to use those starting materials where R and $R^1$ are lower alkyl wherein the alkyl group has from one to five carbon atoms such as methyl, ethyl, propyl, isopropyl, butyl, isobutyl and pentyl. Similarly, when R and $R^1$ are aryl or aralkyl, preferable starting materials are those wherein R and $R^1$ are phenyl, benzyl or substituted phenyl such as a halophenyl as chlorophenyl, dichlorophenyl, bromophenyl or a lower alkyl phenyl such as tolyl.

Also in the case of the starting material (formula I) wherein $R^2$ can be alkyl, aryl or aralkyl, preferable starting materials are used wherein $R^2$ is a lower alkyl having from one to five carbon atoms; phenyl, benzyl or substituted phenyl wherein the substituent is halo generally chloro or bromo, and lower alkyl generally methyl. The most convenient and preferable starting material is benzyl 3,4-dibenzyloxy-2-methyl cinnamate.

Although $R^3$ in the reaction sequence above can be hydrogen, alkyl, aryl or aralkyl, it is preferable that $R^3$ be either hydrogen, lower alkyl having from one to five carbon atoms, phenyl, benzyl or substituted phenyl, said substituents being halo (chloro or bromo), or lower alkyl such as methyl, ethyl and isopropyl, with the generally preferred groups being hydrogen and benzyl. Thus in the reaction sequence wherein $R^3NH_2$ is used, conveniently $R^3$ should be hydrogen or benzyl making the reactant ammonia or benzylamine.

The $R^4$ and $R^5$ substituent on the desired α-methyl substituted phenylalanines (Compound V) are preferably similar to those of R and $R^1$ except that in addition to being all groups that R and $R^1$ can be, $R^4$ and $R^5$ can be hydrogen.

In the first step of our invention sequence, the 3,4-disubstituted-α-methylcinnamic acid or ester derivative thereof is reacted with either chlorine or bromine gas to form the 2-methyl-2,3-dihalo-3-(3',4'-disubstituted-phenyl) propionic acid or ester derivative thereof. This reaction can be carried out at a temperature of from about room temperature to about 90° C. although it is preferable to carry out the reaction at room temperature. The reaction is carried out until the halogen is consumed. A convenient way to determine if the reaction is complete is by a positive starch iodide test which first indicates when an excess of halogen is present. The reaction is generally complete in about 5 minutes although the length of time the reaction takes to go to completion would depend on the addition rate of the halogen and temperature. Generally a stoichometric amount of halogen is used; namely, mole per mole although to insure completion of the reaction, an excess of halogen is preferred. Stirring is also preferred although not necessary for the reaction to proceed.

The reactants are generally dissolved in an inert organic solvent such as a chlorinated hydrocarbon such as chloroform or inert organic solvents such as toluene, hexane, dimethylformamide, benzene, dioxane, diethyl ether and the like.

Once the reaction is complete, the 2-methyl-2,3-dihalo-3-(3',4'-disubstituted phenyl)propionic acid or ester derivative thereof formed can be isolated by known techniques such as concentration of the reaction mixture, extraction of the desired product into an inert solvent such as ether, precipitation of the product and final filtration. The reaction solution can also be concentrated to a lower volume and used directly in the next step.

The conversion of the 2-methyl-2,3-dihalo-3-(3',4'-disubstituted phenyl)propionic acid or ester derivative thereof to the corresponding 3-(3',4'-disubstituted phenyl)-2-methylaziridine-2-carboxylic acid or ester derivative thereof can be accomplished in two ways. One method involves the reaction of the dihalo acid or ester with liquid ammonia. Generally an excess of liquid ammonia is used and the dihalo compound added to the liquid ammonia. In order to facilitate this reaction, a trace of potassium iodide or a trace of a cuprous salt such as cuprous chloride can be added to the reaction mixture. Although the reaction can be carried out in an open vessel at the temperature of liquid ammonia itself, the reaction can also be run in a sealed vessel at high temperatures and at pressures other than atmospheric. The use of sealed vessels and higher temperatures and pressures will generally shorten the reaction time.

Once the reaction is complete, the excess liquid ammonia can be evaporated and the crude 3-(3',4'-disubstituted phenyl)-2-methylaziridine-2-carboxylic acid or ester thereof used directly in the last step.

Another method for preparing the 3-(3',4'-disubstituted phenyl)-2-methyl-2-substituted aziridine carboxylic acid or ester derivative thereof from the correspondingly substituted dihalo compound involves a two-step procedure which comprises first reacting the dihalo product with a substituted amine ($R^3NH_2$ wherein $R^3$ is described previously) to produce the 3-substituted amino, 2-halo compound (Formula III) and subsequent reaction of Compound III with an anhydrous strong base to close the ring and form Compound IV wherein the N portion is substituted with other than hydrogen. The first part of this particular reaction step can be carried out by reacting the dihalo compound with an excess of the particular substituted amine. If the particular amine used is not a liquid, then this portion of the step is preferably carried out in an inert organic solvent such as hexane, dimethylformamide, toluene, chloroform, and the like. The reaction can be run at a temperature of from about −10° C. to about 120° C. preferably, however, at room temperature or lower.

The reaction is usually complete in several hours although the time for completion of the reaction will vary broadly depending on the reactants used. The halo amine (III) can be isolated at this point by known procedures. However, it is preferable to go forth through the next step of this reaction sequence without isolating Compound III. The 3-substituted amino-2-halo compound formed (III) is converted to the corresponding aziridine compound by treating the former with an anhydrous strong base in an inert solvent for a sufficient time to complete the reaction. Generally, the anhydrous base can be sodium, potassium or lithium hydride or other strong base of an alkali metal such as potassium tertiary butoxide. Other bases such as sodamide, metallic sodium and sodium hydroxide are also acceptable. The reaction with the base is preferably carried out in an inert organic solvent such as dimethylformamide or in aromatic hydrocarbons such as toluene or benzene. Use of an inert organic solvent causes the precipitation of an alkali halide. The reaction can be carried out from about room temperature to the boiling point of the particular solvent used. The aziridine product produced can be isolated by destroying any excess base with water, and concentrating the organic phase to yield the aziridine derivative.

The desired α-methyl-3,4-disubstituted phenylalanine and the N-substituted and ether derivatives thereof (Formula V), particularly, however, the α-methyl-3,4-dihydroxy phenylalanine can then be prepared by hydrogenolyzing the corresponding aziridine derivative (Compound IV). The hydrogenolysis is usually carried out by contacting the aziridine derivative (IV) with hydrogen in the presence of a noble metal hydrogenation catalyst such as palladium or Raney nickel or in the presence of other hydrogenation catalysts such as copper chromite. The hydrogenolysis is carried out for a sufficient time to insure that the uptake of hydrogen gas is complete. The hydrogenolysis is generally run in a solvent. Preferable solvents are lower alkanols, conveniently ethanol, aromatic hydrocarbons such as benzene or toluene and inert cyclic ethers such as dioxane or tetrahydrofuran.

The hydrogenolysis is ordinarily carried out at low pressure, generally atmospheric pressure, although the reaction can be carried out in a hydrogenation bomb, wherein the pressure of the hydrogen gas can be raised to up to about 40 lbs./per square inch. If, however, copper chromite is used as a catalyst the hydrogen gas pressure should be at 2,000–6,000 lbs./square inch. The uptake of hydrogen gas generally ceases in about 15 minutes, although the reaction can take as long as several hours. Preferable temperatures at which the hydrogenolysis can be carried out are at ambient temperatures, although the hydrogenolysis can be run at temperatures approaching the boiling point of the solvents used, generally between 80° – 100° C. Once the uptake of hydrogen gas ceases, the catalyst can be removed by filtration. The product (V) can then be isolated from the filtrate by adjusting the filtrate to a pH of 2 to 7 with base and filtering the resulting crystallized product.

Another method of converting the aziridine derivative (IV) to the desired α-methyl-3,4-disubstituted phenylalanine or N-substituted or ester derivatives thereof (V) is to reductively cleave the aziridine derivative by contacting it with sodium in the liquid ammonia. If this reaction is used, an equimolar amount of sodium, preferably an excess is added slowly and dissolved in an excess of liquid ammonia. Compound IV is then added and the reactants stirred until the reaction is complete. The product is isolated by known methods, usually however by destroying the excess sodium, evaporating the excess liquid ammonia and recrystallizing the resulting crude α-methyl-3,4-disubstituted phenylalanines therefrom.

I have found that if the aziridine derivative used has any benzyl groups on the molecule, that is, if R, $R^1$, $R^2$ and $R^3$ (Formula IV) are benzyl, then upon reaction with hydrogen in the presence of a hydrogenation catalyst, any benzyl group will be cleaved along with the concurrent opening of the aziridine ring. If R, $R^1$, $R^2$ or $R^3$ are any other group mentioned except benzyl, no such concurrent cleavage will occur during the reaction with hydrogen in the presence of a hydrogenation catalyst. Also, I have found that the aziridine derivative is reduced with sodium in liquid ammonia, not only will the aziridine ring be opened but any of the groups R, $R^1$, $R^2$ or $R^3$ will be cleaved and replaced with hydrogen.

Thus, in a preferred embodiment of my invention, benzyl 3-(3',4'-dibenzyloxyphenyl)-2-methyl-1-benzylaziridine-2-carboxylate is converted directly to α-methyl-3,4-dihydroxyphenylalanine by the hydrogenolysis reaction using hydrogen in the presence of a hydrogenation catalyst.

Also, in another preferred embodiment of my invention benzyl 3-(3',4'-dimethoxyphenyl)-2-methylaziridine-2-carboxylate is converted directly to α-methyl-3,4-dihydroxyphenylalanine by the reaction of former compound with sodium in liquid ammonia.

As mentioned previously, the levorotatory form of the desired products of this invention, namely, L-α-methyl-3,4-disubstituted phenylalanine, or the N-substituted or ester derivatives thereof, particularly, however, L-α-methyl-3,4-dihydroxyphenylalanine, can be prepared directly if one resolves either of the intermediate products namely, III and IV before proceeding with the remainder of the reaction sequence. The resolutions can be accomplished by procedures known in the art.

The α-methyl-3,4-disubstituted phenylalanines or the N-substituted and ester derivatives thereof, particularly, however, the α-methyl-3,4-dihydroxyphenylalanine can be isolated as non-toxic acid addition salts, especially the hydrochloride salt. This can be done by reacting the free base with a mineral acid preferably hydrochloric acid to form the hydrochloride salt.

Following are detailed examples which illustrate the process of my invention. They should be construed as illustrations of the invention and not limitations thereof.

EXAMPLE 1

Benzyl 3,4-dibenzyloxy-α-methylcinnamate

The sodium salt of 3,4-dibenzyloxy-α-methylcinnamic acid (made from 8.5 g. acid and 1.1 g. of 54 percent sodium hydride in situ) in 85 ml. dimethyl formamide is treated with 3.52 ml. of benzylbromide. The reaction mixture is aged at 60° C. for 2 hours then poured into 0.5 liters of water with stirring. The benzyl 3,4-dibenzyloxy-α-methylcinnamate is collected and washed with water. After air drying, the product weighs 10.6 g.; m.p. 76°–80° C.

Following the procedure described above but using equimolar amounts of the following compounds:

3,4-dimethoxy-α-methylcinnamic acid sodium salt
3,4-diphenyloxy-α-methylcinnamic acid sodium salt
3,4-diethoxy-α-methylcinnamic acid sodium salt
3,4-dioxymethylene-α-methylcinnamic acid potassium salt in place of the sodium salt of 3,4-dibenzyloxy-α-methylcinnamic acid, there is produced benzyl 3,4-dimethoxy-α-methylcinnamate
benzyl 3,4-diphenyloxy-α-methylcinnamate
benzyl 3,4-diethoxy-α-methylcinnamate, and
benzyl 3,4-dioxymethylene-α-methylcinnamate.

Also, methyl 3,4-dibenzyloxy-α-methylcinnamate can be produced by following the procedure above but using an equimolar amount of dimethyl sulfate in place of benzyl bromide.

EXAMPLE 2

Benzyl 2-methyl-2,3-dibromo-3-(3',4'-dibenzyloxyphenyl)-propionate

A solution of 10.6 g. of benzyl 3,4-dibenzyloxy-α-methylcinnamate in 50 ml. of chloroform is treated with 3.70 g. of bromine over a 5 minute period. After 1 hour the solvent is removed by concentration and the oily product crystallized from petroleum ether. The crystallized benzyl 2-methyl-2,3-dibromo-3-(3',4'-dibenzyloxyphenyl)-propionate is washed with petroleum ether and dried. 11.8 Grams of benzyl 2-methyl-2,3-dibromo-3-(3',4'-dibenzyloxyphenyl)propionate having a melting point of 68.5° C.–72° C. are obtained.

Following the procedure above but using an equimolar amount of the following compounds:
benzyl 3,4-dimethoxy-α-methylcinnamate
benzyl 3,4-diphenyloxy-α-methylcinnamate
benzyl 3,4-diethoxy-α-methylsinnamate
benzyl 3,4-dioxymethylene-α-methylcinnamate
methyl 3,4-dibenzyloxy-α-methylcinnamate, and
phenyl 3,4-dibenzyloxy-α-methylcinnamate in place of benzyl 3,4-dibenzyloxy-α-methylcinnamate, there is obtained
benzyl 2-methyl-2,3-dibromo-3-(3',4'-dimethoxyphenyl)-propionate
benzyl 2-methyl-2,3-dibromo-3-(3',4'-diphenyl)-propionate
benzyl 2-methyl-2,3-dibromo-3-(3',4'-diethoxyphenyl)-propionate
benzyl 2-methyl-2,3-dibromo-3-(3',4'-dioxymethylenephenyl)-propionate
methyl 2-methyl-2,3-dibromo-3-(3',4'-dibenzyloxyphenyl)-propionate, and
phenyl 2-methyl-2,3-dibromo-3-(3',4'-dibenzyloxyphenyl)-propionate.

Although bromine was used above to form the dibromo compounds, chlorine gas can be substituted for bromine with the result that the dichloro compounds will be produced.

EXAMPLE 3

A. Benzyl 3-(3',4'-dibenzyloxyphenyl)-2-methylaziridine-2-carboxylate

A suspension of 0.5 g. of benzyl 2-methyl-2,3-dibromo-3-(3',4'-dibenzyloxyphenyl)propionate in 12 ml. of liquid ammonia is stirred for 4 hours. A trace of potassium iodide is added prior to the stirring for 4 hours. After 4 hours of stirring, the ammonia is evaporated and the crude benzyl 3-(3',4'-dibenzyloxyphenyl)-2-methylaziridine-2-carboxylate produced is used directly in the next step.

Following the procedure above but using equimolar amounts of the following:
benzyl 2-methyl-2,3-dibromo-3-(3',4'-dimethoxyphenyl)-propionate
benzyl 2-methyl-2,3-dibromo-3-(3',4'-diphenyloxyphenyl)-propionate
benzyl 2-methyl-2,3-dibromo-3-(3',4'-diethoxyphenyl)-propionate
benzyl 2-methyl-2,3-dibromo-3-(3',4'-dioxymethylenephenyl)-propionate
methyl 2-methyl-2,3-dibromo-3-(3',4'-dibenzyloxyphenyl)-propionate, and
phenyl 2-methyl-2,3-dibromo-3-(3',4'-dibenzyloxyphenyl)-propionate
in place of benzyl 2-methyl-2,3-dibromo-3-(3',4'-dibenzyloxyphenyl)propionate used above, there is produced respectively
benzyl 3-(3',4'-dimethoxyphenyl)-2-methylaziridine-2-carboxylate
benzyl 3-(3',4'-diphenyloxyphenyl)-2-methylaziridine-2-carboxylate
benzyl 3-(3',4'-diethoxyphenyl)-2-methylaziridine-2-carboxylate
benzyl 3-(3',4'-dioxymethylenephenyl)-2-methylaziridine-2-carboxylate
methyl 3-(3',4'-dibenzyloxyphenyl)-2-methylaziridine-2-carboxylate, and
phenyl 3-(3',4'-dibenzyloxyphenyl)-2-methylaziridine-2-carboxylate.

B. Benzyl 3-(3',4'-dibenzyloxyphenyl)-2-methyl-1-benzylaziridine-2-carboxylate

Approximately 0.5 g. of benzyl 2-methyl-2,3-dibromo-3-(3',4'-dibenzyloxyphenyl)propionate is added at room temperature to 5 ml. of benzylamine. The reaction mixture is stirred at room temperature for several hours. Petroleum ether is then added to the reaction mixture, causing benzyl 2-methyl-2-benzylamino-3-bromo-3-(3',4'-dibenzyloxyphenyl)propionate to precipitate. The latter product is washed free of benzylamine with petroleum ether and added slowly to a mixture of sodium hydride in dimethyl formamide. The sodium bromide which precipitates is then filtered and the filtrate stripped of dimethyl formamide. The benzyl 3-(3',4'-dibenzyloxyphenyl)-2-methyl-1-benzylaziridine-2-carboxylate formed is isolated by extracting it with a water-benzene mixture, discarding the inorganic phase and concentrating the benzene layer to a low volume followed by filtration of the benzyl 3-(3',4'-dibenzyloxyphenyl)-2-methyl-1-benzylaziridine-2-carboxylate.

Following the procedure above but using equimolar amounts of the following:
benzyl 2-methyl-2,3-dibromo-3-(3',4'-dimethoxyphenyl)-propionate
benzyl 2-methyl-2,3-dibromo-3-(3',4'-diphenyloxyphenyl)-propionate
benzyl 2-methyl-2,3-dibromo-3-(3',4'-diethoxyphenyl)-propionate
benzyl 2-methyl-2,3-dibromo-3-(3',4'-dioxymethylenephenyl)-propionate
methyl 2-methyl-2,3-dibromo-3-(3',4'-dibenzyloxyphenyl)-propionate, and
phenyl 2-methyl-2,3-dibromo-3-(3',4'-dibenzyloxyphenyl)-propionate
in place of benzyl 2-methyl-2,3-dibromo-3-(3',4'-dibenzyloxyphenyl)propionate, there is obtained respectively
benzyl 3-(3',4'-dimethoxyphenyl)-2-methyl-1-benzylaziridine-2-carboxylate
benzyl 3-(3',4'-diphenyloxyphenyl)-2-methyl-1-benzylaziridine-2-carboxylate
benzyl 3-(3',4'-diethoxyphenyl)-2-methyl-1-methylaziridine-2-carboxylate
benzyl 3-(3',4'-dioxymethylenephenyl)-2-methyl-1-benzylaziridine-2-carboxylate
methyl 3-(3',4'-dibenzyloxyphenyl)-2-methyl-1-benzylaziridine-2-carboxylate, and
phenyl 3-(3',4'-dibenzyloxyphenyl)-2-methyl-1-benzylaziridine-2-carboxylate.

Similarly, following the procedure of part B above but using an equimolar amount of methylamine, ethylamine, aniline and m-chloroaniline in place of benzylamine, there is produced benzyl 3-(3',4'-dibenzyloxyphenyl)-2-methyl-1-[(methyl), (ethyl), phenyl) or (m-chlorophenyl)]aziridine-2-carboxylate respectively.

EXAMPLE 4

α-Methyl-3,4-dihydroxyphenylalanine

Approximately 3 g. of benzyl 3-(3',4'-dibenzyloxyphenyl)-2-methylaziridine-2-carboxylate is dissolved in 50 ml. ethanol and 0.3 g. palladium-on-carbon added to the solution. The mixture is placed in a hydrogenation bomb and hydrogen gas admitted under atmospheric pressure. After the uptake of hydrogen is complete, the catalyst is filtered and the residual α-methyl-3,4dihydroxyphenylalanine washed from the catalyst with dilute hydrochloric acid. The acidic extracts are combined and made to a pH of 4 with dilute sodium hydroxide. The crystallized α-methyl-3,4-dihydroxyphenylalanine is filtered and the resulting solid material dried.

Following the procedure above but using equimolar amounts of
- benzyl 3-(3',4'-dimethoxyphenyl)-2-methylaziridine-2-carboxylate
- benzyl 3-(3',4'-diethoxyphenyl)-2-methylaziridine-2-carboxylate
- methyl 3-(3',4'-dibenzyloxyphenyl)-2-methylaziridine-2-carboxylate
- benzyl 3-(3',4'-dimethoxyphenyl)-2-methyl-1-benzylaziridine-2-carboxylate
- methyl 3-(3',4'-dibenzyloxyphenyl)-2-methylaziridine-2-carboxylate
- benzyl 3-(3',4'-dibenzyloxyphenyl)-2-methyl-1-methylaziridine-2-carboxylate
- benzyl 3-(3',4'-diphenoxyphenyl)-2-methylaziridine-2-carboxylate, and
- benzyl 3-(3',4'-dioxymethylenephenyl)-2-methylaziridine-2-carboxylate in place of benzyl 3-(3',4'-dibenzyloxyphenyl)-2-methylaziridine-2-carboxylate used above, there is produced
- α-methyl-3,4-dimethoxyphenylalanine
- α-methyl-3,4-diethoxyphenylalanine
- methyl ester of α-methyl-3,4-dihydroxyphenylalanine
- α-methyl-3,4-dimethoxyphenylalanine
- methyl ester of α-methyl-3,4-dihydroxyphenylalanine
- α-methyl-N-methyl-3,4-dihydroxyphenylalanine
- α-methyl-3,4-diphenoxyphenylalanine, and
- α-methyl-3,4-dioxymethylenephenylalanine.

Similarly, the above products can be prepared by substituting an equivalent amount of Raney nickel catalyst and copper chromite in place of palladium or carbon and following the procedure described above.

EXAMPLE 5

α-Methyl-3,4-dihydroxyphenylalanine

Approximately 3 g. of benzyl 3-(3',4'-dibenzyloxyphenyl)-2-methylaziridine-2-carboxylate is added slowly to a solution of 4.5 gms. sodium dissolved in 100 ml. of liquid ammonia. The reaction mixture is stirred for 9 hours after which time any excess sodium is destroyed by adding ice to the reaction mixture. The liquid ammonia is evaporated resulting in crude α-methyl-3,4-dihydroxyphenylalanine. The product is recrystallized from methanol-water by adjusting the pH to 4 to yield essentially pure α-methyl-3,4-dihydroxyphenylalanine.

Following the procedure above but using an equimolar amount of the following:
- benzyl 3-(3',4'-dimethoxyphenyl)-2-methylaziridine-2-carboxylate
- benzyl 3-(3',4'-diethoxyphenyl)-2-methylaziridine-2-carboxylate
- methyl 3-(3',4'-dibenzyloxyphenyl)-2-methylaziridine-2-carboxylate, and
- benzyl 3-(3',4'-dioxymethylenephenyl)-2-methylaziridine-2-carboxylate in place of benzyl 3-(3',4'-dibenzyloxyphenyl)-2-methylaziridine-2-carboxylate, there is produced α-methyl-3,4-dihydroxyphenylalanine in all cases.

What is claimed is:

1. A process for the preparation of a compound of the formula

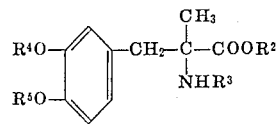

wherein
R$^4$ and R$^5$ are the same or different and are hydrogen, alkyl, aryl or aralkyl, or when taken together a methylene group;
R$^2$ is hydrogen, alkyl, aryl or aralkyl; and
R$^3$ is hydrogen, alkyl, aryl or aralkyl
which comprises hydrogenolyzing, in a solvent at a temperature of from ambient temperature to 100° C., an aziridine compound of the formula

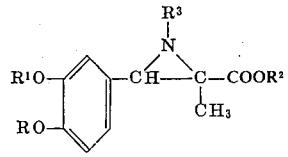

wherein R and R$^1$ are the same or different and are alkyl, aryl or aralkyl or when taken together a methylene group and R$^2$ and R$^3$ are as defined above.

2. A process for the preparation of α-methyl-3,4-dihydroxyphenylalanine which comprises reacting, in a solvent, benzyl 3-(3', 4'-dibenzyloxyphenyl)-2-methylaziridine-2-carboxylate with hydrogen in the presence of a hydrogenation catalyst at a temperature of from ambient temperature to 100° C.

3. A process for the preparation of a α-methyl-3,4-dihydroxyphenylalanine which comprises reacting benzyl 3-(3', 4'-dimethoxyphenyl)-2-methylaziridine-2-carboxylate with sodium in liquid ammonia at a temperature of from ambient temperature to 100° C.

4. The process of claim 1 wherein the hydrogenolysis is performed by reacting the aziridine compound with hydrogen in the presence of a hydrogenation catalyst.

5. The process of claim 1 wherein the hydrogenolysis is performed by reacting the aziridine compound with sodium in liquid ammonia.

6. The process of claim 1 wherein the L-form of the aziridine compound is used to produce the L-form of the desired product.

7. A process for the preparation of compounds of the formula

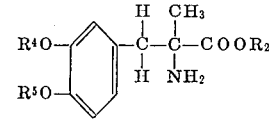

wherein R⁴ and R⁵ are the same or different and are hydrogen, alkyl, aryl, aralkyl or when taken together methylene and R² is hydrogen, alkyl, aryl or aralkyl which comprises (a) reacting in an inert organic solvent and at a temperature of from about room temperature to about 90° C. a compound of the formula

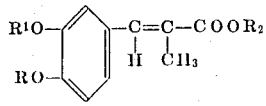

wherein R and R¹ are the same or different and are alkyl, aryl, aralkyl or when taken together methylene and R² is as above with a compound of the formula $X_2$ wherein X is chloro or bromo to form a compound of the formula

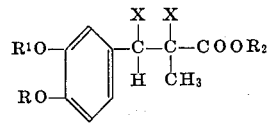

wherein R, R¹, R² and X are as above,
b. contacting in an inert organic solvent and at a temperature of from about −10° C. to about 120° C. the product of step (a) with ammonia to form an aziridine compound of the formula

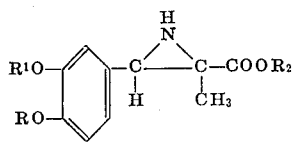

wherein R, R¹ and R² are as defined above and
c. hydrogenolyzing in a solvent the product of step (b) with hydrogen in the presence of a hydrogenation catalyst or with sodium in liquid ammonia to form the desired product.

8. A process for the preparation of compounds of the formula

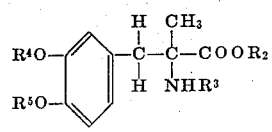

wherein
R⁴ and R⁵ are the same or different and are hydrogen, alkyl, aryl, aralkyl or when taken together methylene, R² is hydrogen, alkyl, aryl or aralkyl,
R³ is hydrogen, alkyl, aryl or aralkyl
which comprises (a) reacting in an inert organic solvent and at a temperature of from about room temperature to about 90° C. a compound of the formula

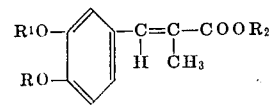

wherein R and R¹ are the same or different and are alkyl, aryl, aralkyl or when taken together methylene and R² is as above with a compound of the formula $X_2$ wherein X is chloro or bromo to form a compound of the formula

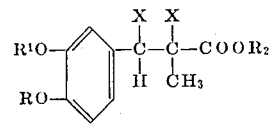

wherein R, R¹, R² and X are as above,
b. contacting in an inert organic solvent and at a temperature of from about −10° C. to about 120° C. the product of step (a) with an amine of the formula R³NH₂ wherein R³ is as above defined to form a compound of the formula

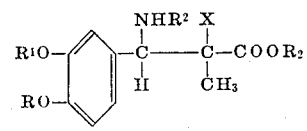

wherein R, R¹, R² and R³ are as defined above,
c. contacting in an inert organic solvent and at a temperature of from about room temperature to about boiling point of said solvent the product of step (b) with an anhydrous base to form a compound of the formula

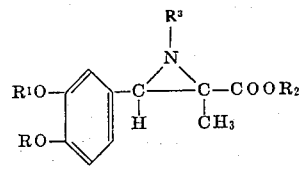

wherein R, R¹, R² and R³ are as above defined,
d. and hydrozenolyzing, in a solvent, the product of step (c) with hydrogen in the presence of a hydrogenation catalyst or with sodium in liquid ammonia to form the desired product.

* * * * *